US009510032B2

(12) United States Patent
Charania et al.

(10) Patent No.: US 9,510,032 B2
(45) Date of Patent: Nov. 29, 2016

(54) PROGRAM GUIDE WITH GAMIFICATION OF USER METADATA

(71) Applicants: Cellco Partnership, Basking Ridge, NJ (US); Verizon Patent and Licensing Inc., Basking Ridge, NJ (US)

(72) Inventors: Rahim A. Charania, Euless, TX (US); Bradley D. Beaver, Richardson, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 32 days.

(21) Appl. No.: 14/262,024

(22) Filed: Apr. 25, 2014

(65) Prior Publication Data

US 2015/0312634 A1    Oct. 29, 2015

(51) Int. Cl.
| H04N 5/445 | (2011.01) |
| H04N 21/25 | (2011.01) |
| H04N 21/4722 | (2011.01) |
| H04N 21/475 | (2011.01) |
| H04N 21/482 | (2011.01) |

(52) U.S. Cl.
CPC ........ *H04N 21/252* (2013.01); *H04N 21/4722* (2013.01); *H04N 21/4756* (2013.01); *H04N 21/4826* (2013.01); *H04N 21/4828* (2013.01)

(58) Field of Classification Search
CPC ............... H04N 2005/44521; H04N 21/4784; H04N 21/4622; H04N 21/4316

USPC ...................................................... 725/39, 43
See application file for complete search history.

(56) References Cited

U.S. PATENT DOCUMENTS

| 8,316,399 | B1* | 11/2012 | Nush ................. H04N 21/4583 725/55 |
| 2003/0110486 | A1* | 6/2003 | Dew et al. ...................... 725/24 |
| 2007/0157221 | A1* | 7/2007 | Ou et al. ......................... 725/10 |
| 2008/0244655 | A1* | 10/2008 | Mattila et al. .................. 725/46 |
| 2009/0007179 | A1* | 1/2009 | Angiolillo et al. ............. 725/44 |
| 2010/0242074 | A1* | 9/2010 | Rouse et al. .................. 725/100 |
| 2011/0185385 | A1* | 7/2011 | Park ....................... H04N 7/173 725/40 |
| 2011/0276882 | A1* | 11/2011 | Buehler et al. ............... 715/727 |
| 2012/0272160 | A1* | 10/2012 | Spivack ................. G06Q 10/10 715/752 |
| 2012/0311618 | A1* | 12/2012 | Blaxland .......................... 725/9 |
| 2014/0082672 | A1* | 3/2014 | Casey ............. H04N 21/26283 725/50 |

\* cited by examiner

*Primary Examiner* — John Schnurr
*Assistant Examiner* — Cynthia Fogg

(57) ABSTRACT

A device may receive user metadata associated with media content identified in an interactive program guide (IPG). The user metadata may be based on input provided by a user via the IPG, and the media content may be associated with a media content identifier. The device may determine a manner in which the user metadata is to be processed. The device may process the user metadata in the manner in which the user metadata is to be processed. The user metadata may be processed to permit the user to view the user metadata, via the IPG, at a later time, or the user metadata may be processed to permit another user, associated with another device, to view the user metadata.

20 Claims, 12 Drawing Sheets

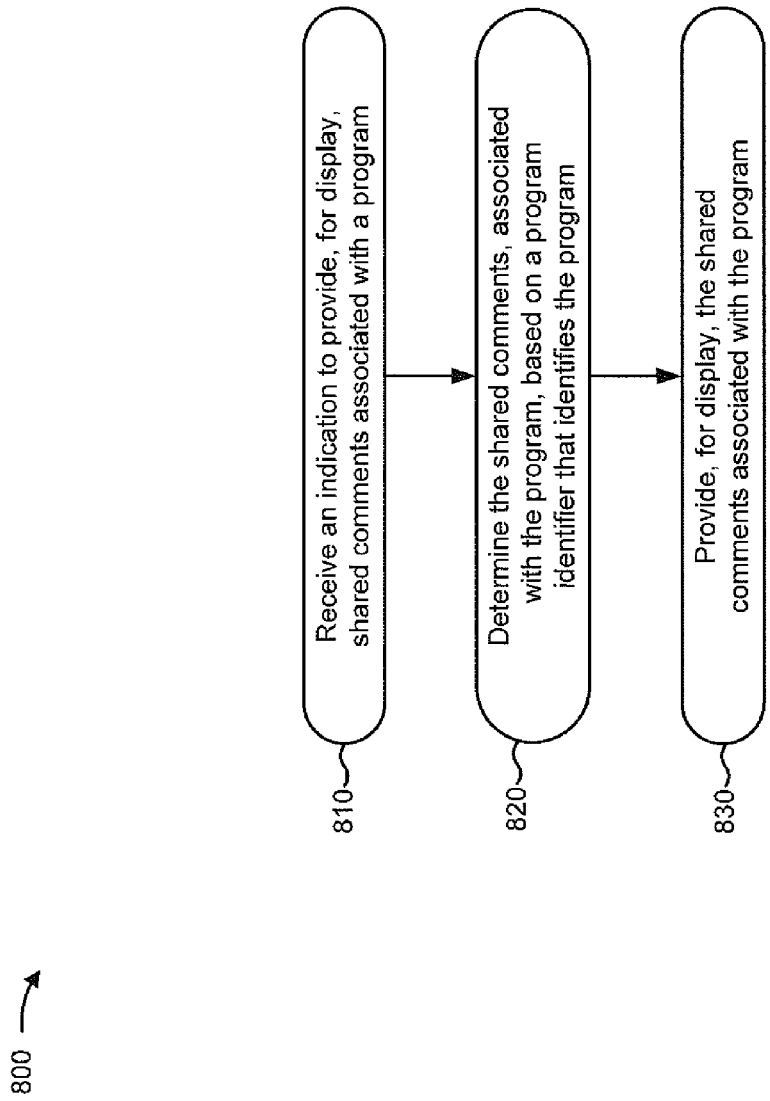

PROGRAM GUIDE WITH GAMIFICATION OF USER METADATA

BACKGROUND

A set-top box may provide an interactive program guide (IPG) (e.g., an interactive electronic program guide (EPG)) that allows a user to navigate through guide data related to media content provided by a service provider.

BRIEF DESCRIPTION OF THE DRAWINGS

FIG. 8 is a flow chart of an example process for providing, for display, shared metadata, associated with media content, based on a content identifier associated with the media content.

DETAILED DESCRIPTION OF PREFERRED EMBODIMENTS

The following detailed description of example implementations refers to the accompanying drawings. The same reference numbers in different drawings may identify the same or similar elements.

A user may navigate an IPG, provided by a media client (e.g., a set top box) and displayed via a display device (e.g., a television, a monitor, etc.), that identifies media content (e.g., television programs, movies, music videos, etc.) that the user may choose to view. The IPG may include general information associated with the media content (e.g., a title, a date, a year, an episode number, a cast listing, a synopsis, etc.). However, the user may be unable to provide user metadata (e.g., a comment, which may include text or a rating provided by the user), associated with the media content, such that the user may view the user metadata at a later time and/or share the user metadata with another user. Similarly, the user may be unable to view shared metadata (e.g., a comment provided by another user) associated with the media content. Implementations described herein may allow a user to provide user metadata, associated with media content identified in an interactive program guide, such that the user may view and/or share the user metadata via the interactive program guide. Implementations described herein may also allow the user to view shared metadata, associated with the media content and provided by another user, via the interactive program guide. Similarly, implementations described herein may allow the user to communicate with a community of users, associated with the media content, by applying gamification concepts to the user metadata and/or the shared metadata (e.g., by allowing the user to share the user metadata, interact with the shared metadata, respond to the shared metadata, vote on the shared metadata, rate the shared metadata, etc.).

Figure 1A:
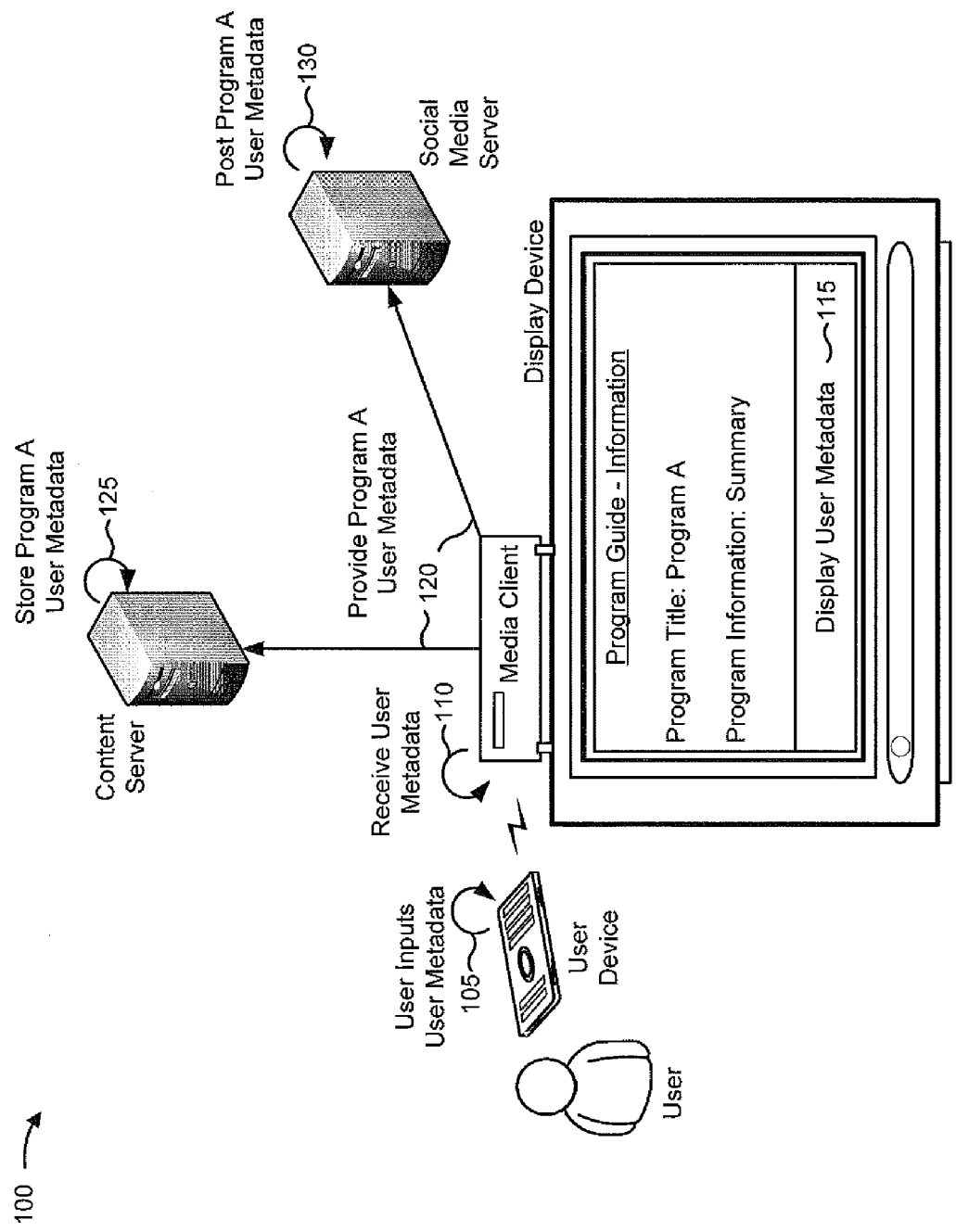
FIGS. 1A and 1B are diagrams of an overview of an example implementation described herein.
Figure 1B:
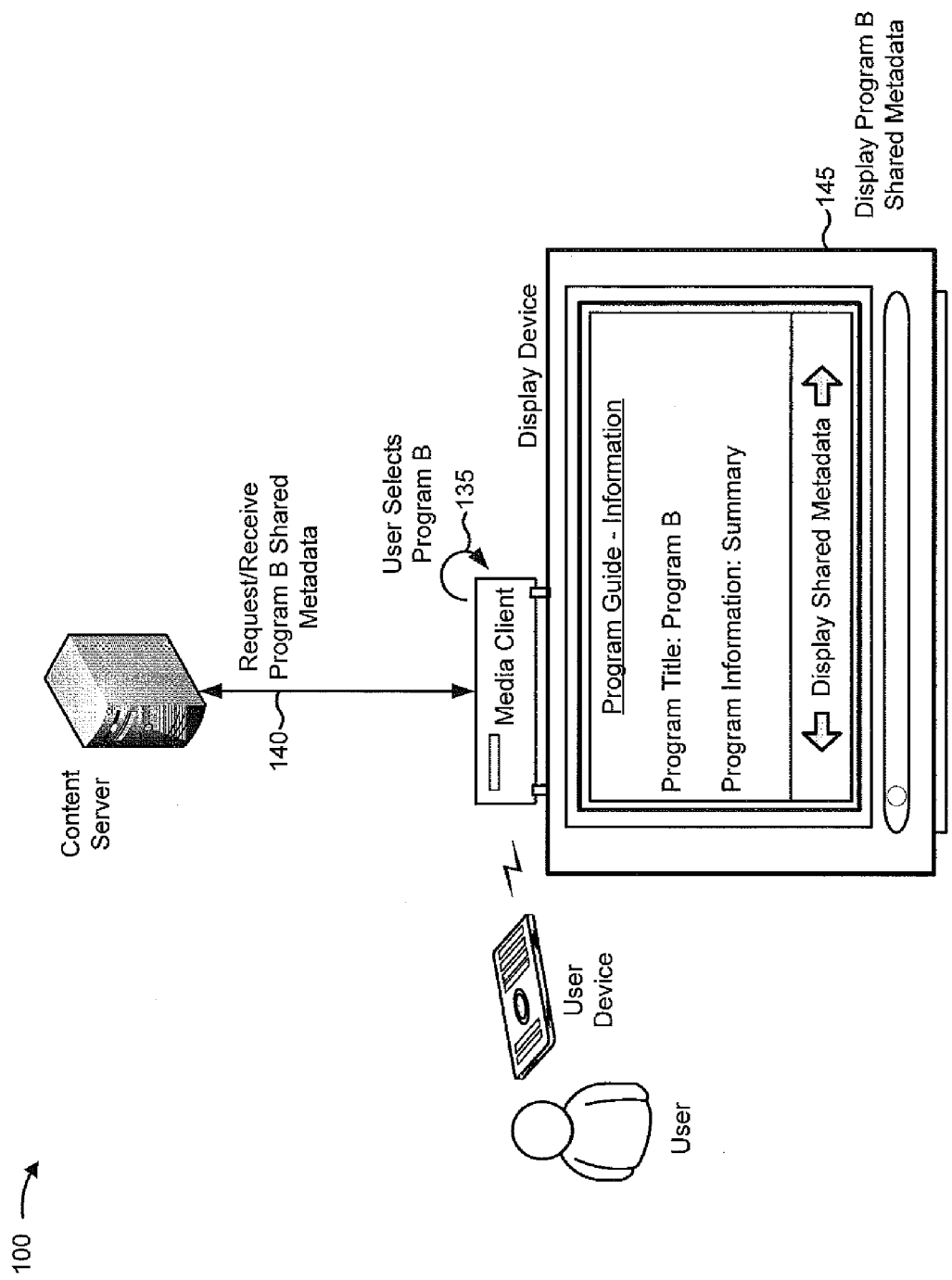

FIGS. 1A and 1B are diagrams of an overview of an example implementation 100 described herein. For the purposes of example implementation 100, assume that a media client is configured to receive input, provided by a user via a user device, that allows the user to navigate an IPG provided by the media client and displayed via a display device. Further, assume that a content server, associated with the media client, stores information that identifies media content included in the IPG, and that the content server is configured to receive and store user metadata (e.g., user comments) associated with the media content. Finally, assume that the user has a social media account, associated with a social media server, and that the social media server is configured to receive user metadata, associated with the user, and post the user metadata to the social media account.

As shown in FIG. 1A, assume that the user has indicated, via the IPG, that the user wishes to view an information screen associated with particular media content, included in the IPG, identified as Program A. As further shown, assume that the user wishes to provide user metadata (e.g., a user comment) associated with Program A. As shown by reference number 105, the user may provide, to the media client (e.g., via the user device), input associated with the user metadata. As shown by reference number 110, the media client may receive the user metadata, and, as shown by reference number 115, may cause the user metadata to be displayed within the information screen associated with the IPG.

As further shown, assume that the user indicates that the user wishes to share the user metadata (e.g., such that other users may view the user metadata). As shown, by reference number 120, the media client may provide the user metadata (e.g., along with information indicating that the user metadata is associated with Program A) to the content server. As shown by reference number 125, the content server may receive and store the user metadata associated with Program A. As also shown by reference number 120, the media client may provide the user metadata to the social media server (e.g., when the user has indicated that the user metadata is to posted to the social media account associated with the user), and, as shown by reference number 130, the social media server may post the user metadata to the social media account. In this way, the user may provide the user metadata such that other users (e.g., other users associated with a service provider of the IPG, other users associated with a social media application associated with the social media server, such as friends, family, contacts, etc.), may view, interact with, respond to, etc. the user metadata.

For the purposes of FIG. 1B, assume that the media client is configured to determine and display shared metadata associated with programs included in the IPG (e.g., such that the user may view, interact with, respond to, etc. the shared metadata). As shown by reference number 135, the user may select media content, identified as Program B, included in the IPG such that the media client provides, for display via the display device, an information screen associated with Program B. As shown by reference number 140, the media client may request, from the content server, shared metadata associated with Program B, and the content server may provide the shared metadata (e.g., stored by the content server) to the media client. In some implementations, the media client may also request shared metadata from the social media server (not shown). As shown by reference number 145, the media client may provide, for display via the display device, the shared metadata associated with Program B. Gamification concepts may then be applied to the shared metadata to encourage the user to view the shared metadata, interact with the shared metadata, respond to the shared metadata, vote on the shared metadata, rate the shared metadata, etc. (e.g., where gamification includes concepts associated with applying game-design thinking to a non-game application in order to encourage communication among users, and/or make the non-game application entertaining, rewarding, and/or engaging for users).

In this way, a user may provide, via an IPG, user metadata associated with media content such that the user may view and/or share the user metadata via a media client associated with a service provider. Similarly, the user may view, via the IPG, shared metadata, associated with the media content, provided by another user. Similarly, the user may communicate and/or interact with with a community of users, associated with the media content, through gamification of the user metadata and/or the shared metadata (e.g., by encouraging, such as via an offer of rewards, the user to share the user metadata, interact with the shared metadata, respond to the shared metadata, vote on the shared metadata, rate the shared metadata, etc.).

Figure 2:
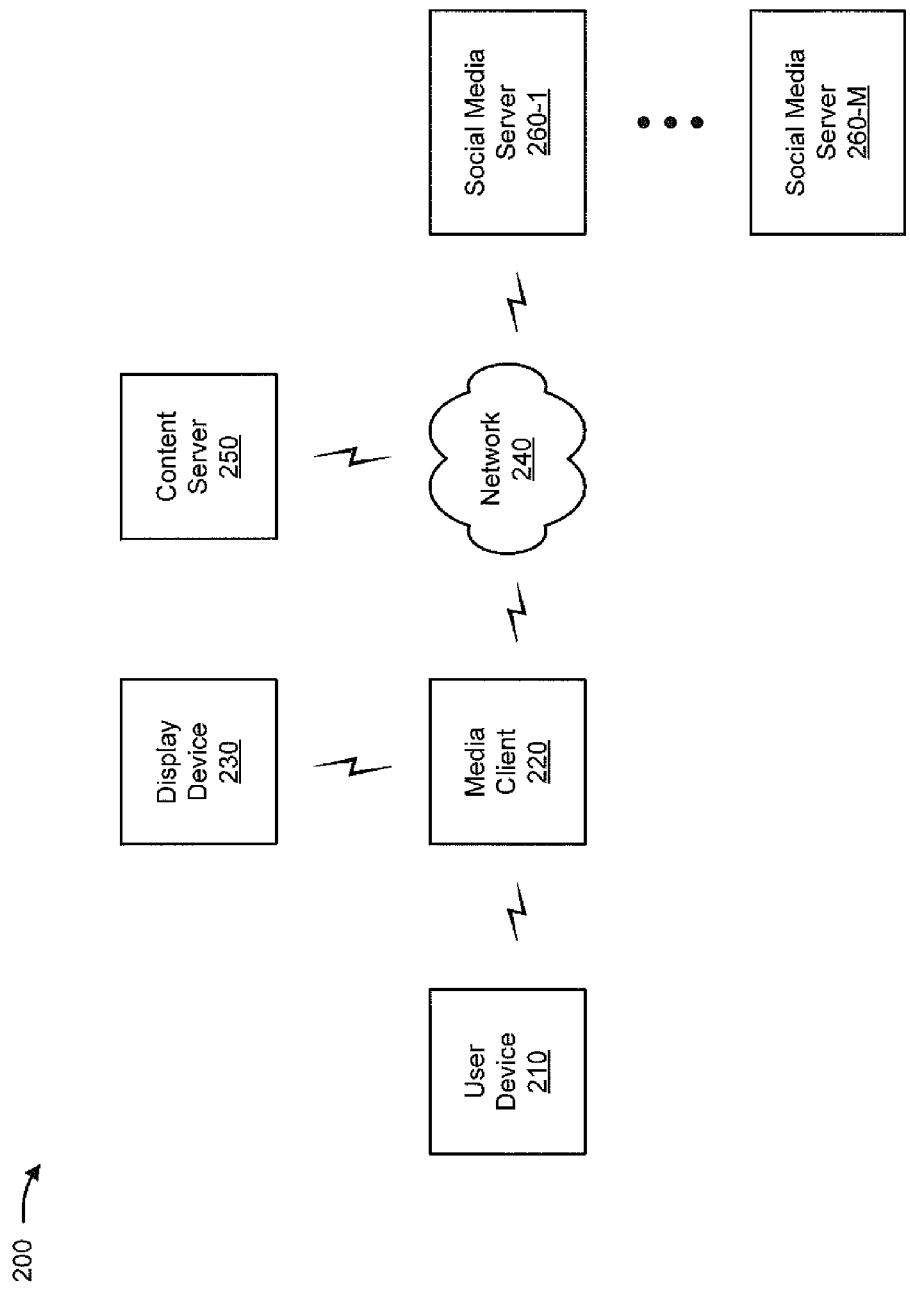
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a media client 220, a display device 230, a network 240, a content server 250, and/or a set of social media servers 260-1 through 260-M (M>1) (hereinafter collectively referred to as "social media servers 260," and individually as "social media server 260"). Devices of environment 200 may interconnect via wired connections, wireless connections, or a combination of wired and wireless connections.

User device 210 may include a device that allows a user to control programming, applications, and/or content displayed on display device 230 via interaction with media client 220. User device 210 may transmit signals, such as, for example, infrared signals, to a signal receiver associated with media client 220. User device 210 may take the form of a remote control, a personal digital assistant ("PDA") (e.g., that can include a radiotelephone, a pager, Internet/intranet access, etc.), a smart phone, a desktop computer, a laptop computer, a tablet computer, and/or another type of wired or wireless device. In some implementations, user device 210, media client 220, and/or display device 230 may be incorporated into a single device.

Media client 220 may include a device capable of receiving, generating processing, storing, and/or providing media content and providing the media content to a user (e.g., via display device 230). Media client 220 may allow a user to provide input associated with an IPG (e.g., to navigate the IPG) and to alter programming and/or content provided by media client 220 based on a signal (e.g., a channel up or channel down signal) from, for example, user device 210. Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 220 may be capable of receiving, providing, storing, and/or determining metadata (e.g., a user comment, a shared comment, etc.) associated with media content identified in the IPG.

Display device 230 may include any digital or analog display that is capable of presenting audio and/or video content provided by media client 220. Display device 230 may include a technology, such as a cathode ray tube (CRT) display, a liquid crystal display (LCD), a light-emitting diode (LED) display, a plasma display, etc. Examples of display device 230 may include a television, a projector, a computer monitor, and/or another type of devices capable of presenting audio and/or video content.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

Content server 250 may include one or more devices capable of receiving, determining, processing, storing, and/or providing information, such as metadata associated with media content included in the IPG. For example, content server 250 may include a server device or a collection of server devices. In some implementations, content server 250 may include a communication interface that allows content server 250 to receive information from and/or transmit information to other devices in environment 200. In some implementations, content server 220 may provide an IPG to one or more media clients 220. Content server 250 may be dedicated to media clients 220 associated with a single household or a group of households. In some implementations, content server 250 may be capable of receiving, processing, and/or storing (e.g., in a data structure) media content identifiers that identify media content included in the IPG.

Social media server 260 may include one or more devices capable of receiving, generating, processing, storing, and/or providing information associated with a social media application. For example, social media server 260 may include a server device or a collection of server devices. In some implementations, social media server 260 may be associated with a social media application associated with a user of user device 210 and/or media client 220. In some implementations, social media server 260 may be capable of receiving, storing, processing, and/or providing metadata (e.g., a user comment, a shared comment, etc.) associated with a program included in the IPG, and posting the metadata to a social media account associated with the user.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
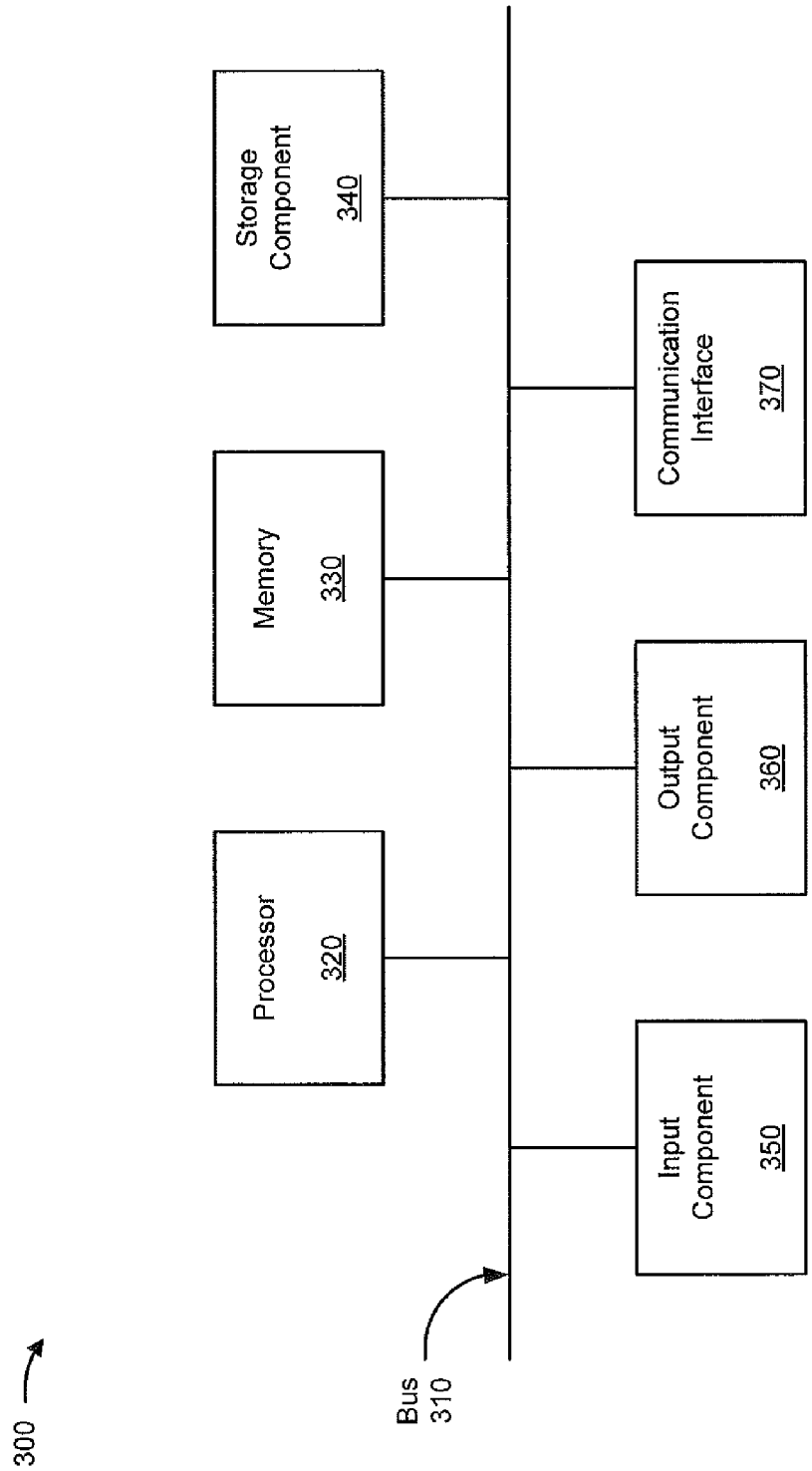
FIG. 3 is a diagram of example components of one or more devices of FIG. 2.

FIG. 3 is a diagram of example components of a device 300. Device 300 may correspond to user device 210, media client 220, display device 230, content server 250, and/or social media server 260. In some implementations, user device 210, media client 220, display device 230, content server 250, and/or social media server 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
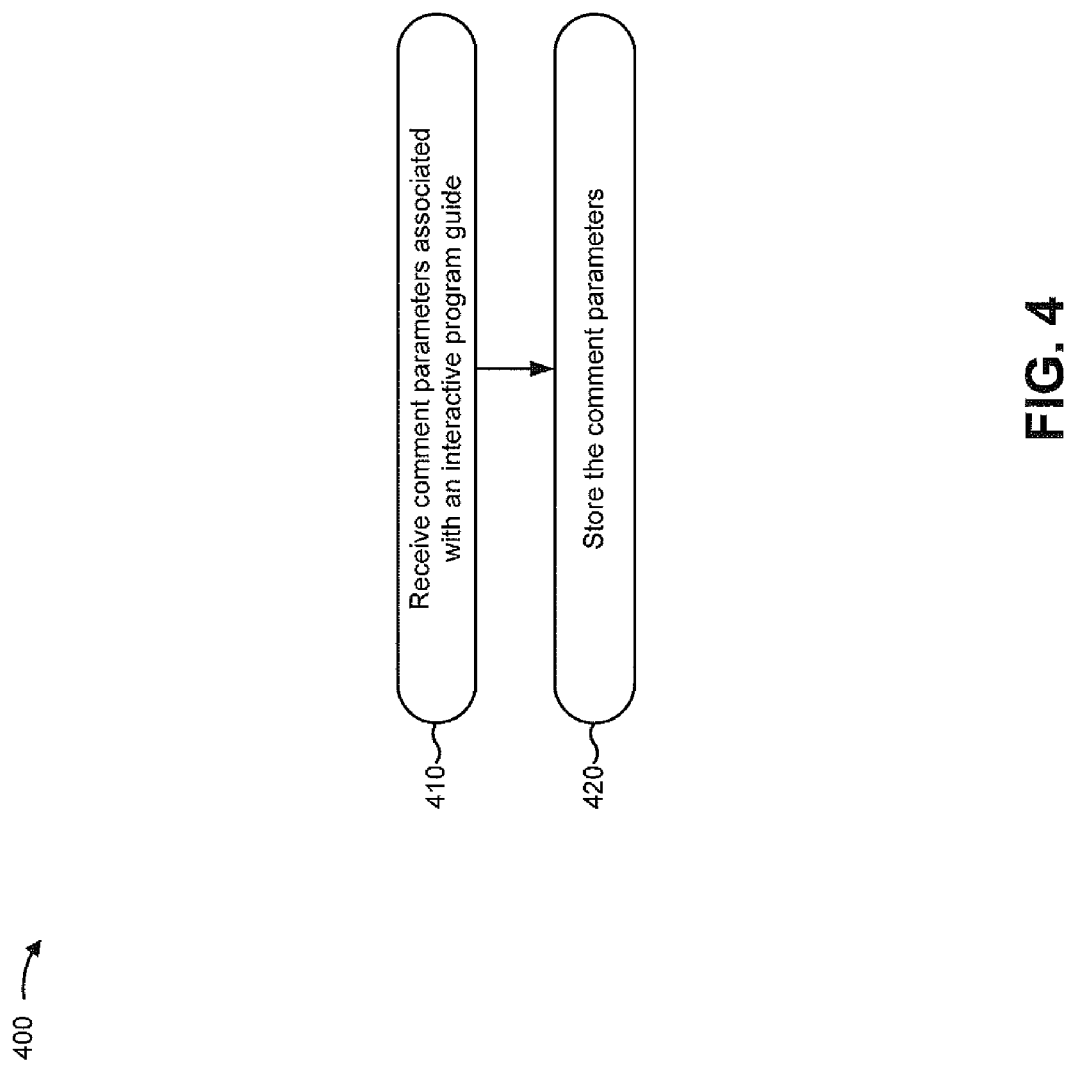
FIG. 4 is a flow chart of an example process for receiving and storing metadata parameters associated with an interactive program guide.

FIG. 4 is a flow chart of an example process 400 for receiving and storing metadata parameters associated with an interactive program guide. In some implementations, one or more process blocks of FIG. 4 may be performed by media client 220. In some implementations, one or more process blocks of FIG. 4 may be performed by another device or a group of devices separate from or including media client 220, such as another device included in environment 200. While FIG. 4 describes metadata parameters in the form of comment parameters, the processes and/or methods associated with FIG. 4 may equally apply to metadata parameters associated with forms of metadata other than comments (e.g., a review, an opinion, etc.).

As shown in FIG. 4, process 400 may include receiving comment parameters associated with an interactive program guide (block 410). For example, media client 220 may receive comment parameters associated with an IPG. In some implementations, media client 220 may receive the comment parameters when a user provides the comment parameters (e.g., via user device 210). Additionally, or alternatively, media client 220 may receive the comment parameters when the comment parameters are provided by another device, such as content server 250.

A comment parameter may include a parameter associated with a manner in which a comment (e.g., a user comment, a shared comment, etc.), associated with media content identified in an IPG, is to be received, stored, displayed, provided, and/or shared via media client 220.

In some implementations, the comment parameter may be associated with a user comment (e.g., a comment provided to media client 220 via user device 210). For example, the comment parameter may indicate whether media client 220 is enabled to receive the user comment (e.g., whether a user comment feature is enabled or disabled). As another example, the comment parameter may be associated with storing the user comment (e.g., whether the user comment is to be stored by media client 220, a time period that media client 220 is to store the user comment, etc.). As yet another example, the comment parameter may be associated with sharing the user comment (e.g., information identifying a social media account to which the user comment may posted, login information associated with the social media account, etc.).

Additionally, or alternatively, the comment parameter may be associated with a shared comment (e.g., a comment provided by another user associated with another media client 220). For example, the comment parameter may indicate whether media client 220 is enabled to provide, for display, the shared comment (e.g., whether a shared comment feature is enabled or disabled). As another example, the comment parameter may be associated with determining the shared comment (e.g., an interval of time at which media client 220 is to check for a new shared comment stored by content server 250 and/or social media server 260, etc.). As another example, the comment parameter may be associated with a manner in which the shared comment is to be displayed (e.g., based on a comment rating associated with the shared comment, based on a date associated with the shared comment, based on whether the shared comment is identified as an offensive comment, based on a user that provided the shared comment, etc.). Similarly, the comment parameter may be associated with a manner in which the shared comment is to be displayed in the IPG (e.g., at the bottom of an information screen associated with a program, at the top of the information screen associated with the program, etc.).

In some implementations, media client 220 may receive the comment parameter based on user input. For example, media client 220 may provide, for display via display device 230, a user interface associated with one or more comment parameters, and the user may provide, via one or more input elements (e.g., text boxes, check boxes, drop down menus, radio buttons, etc.) included in the user interface, input associated with the one or more comment parameters. Additionally, or alternatively, media client 220 may receive the comment parameter based on determining a default comment parameter stored by media client 220 and/or content server 250 (e.g., when the user has not specified the comment parameter, when the user indicates that the user wishes to use a default comment parameter, etc.). In some implementations, media client 220 may receive multiple comment parameters (e.g., comment parameters associated with user comments, comment parameters associated with shared comments, etc.).

As further shown in FIG. 4, process 400 may include storing the comment parameters (block 420). For example, media client 220 may store the comment parameters. In some implementations, media client 220 may store the comment parameters when media client 220 receives the comment parameters (e.g., after media client 220 receives the comment parameters). Additionally, or alternatively, media client 220 may store the comment parameters based on information, indicating that media client 220 is to store the comment parameters, received from another device, such as user device 210.

In some implementations, media client 220 may store the comment parameters in a memory location (e.g., a RAM, a ROM, a cache, a hard disk, etc.) of media client 220. Additionally, or alternatively, media client 220 may provide the comment parameters to another device for storage. For example, media client 220 may provide the comment parameters to content server 250 for storage.

In some implementations, media client 220 may store information associated with the comment parameters such that previous comment parameters (e.g., comment parameters provided by the user at an earlier time) are overwritten and/or deleted. Additionally, or alternatively, media client 220 may store the comment parameters such that media client 220 may retrieve the comment parameters at a later time. In some implementations, media client 220 may store the comment parameters with respect to media client 220 (e.g., such that the comment parameters apply to all users of media client 220). Additionally, or alternatively, media client 220 may store the comment parameters with respect to the user (e.g., such that the comment parameters apply only to the user, when the user logs in to media client 220 to identify the user).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
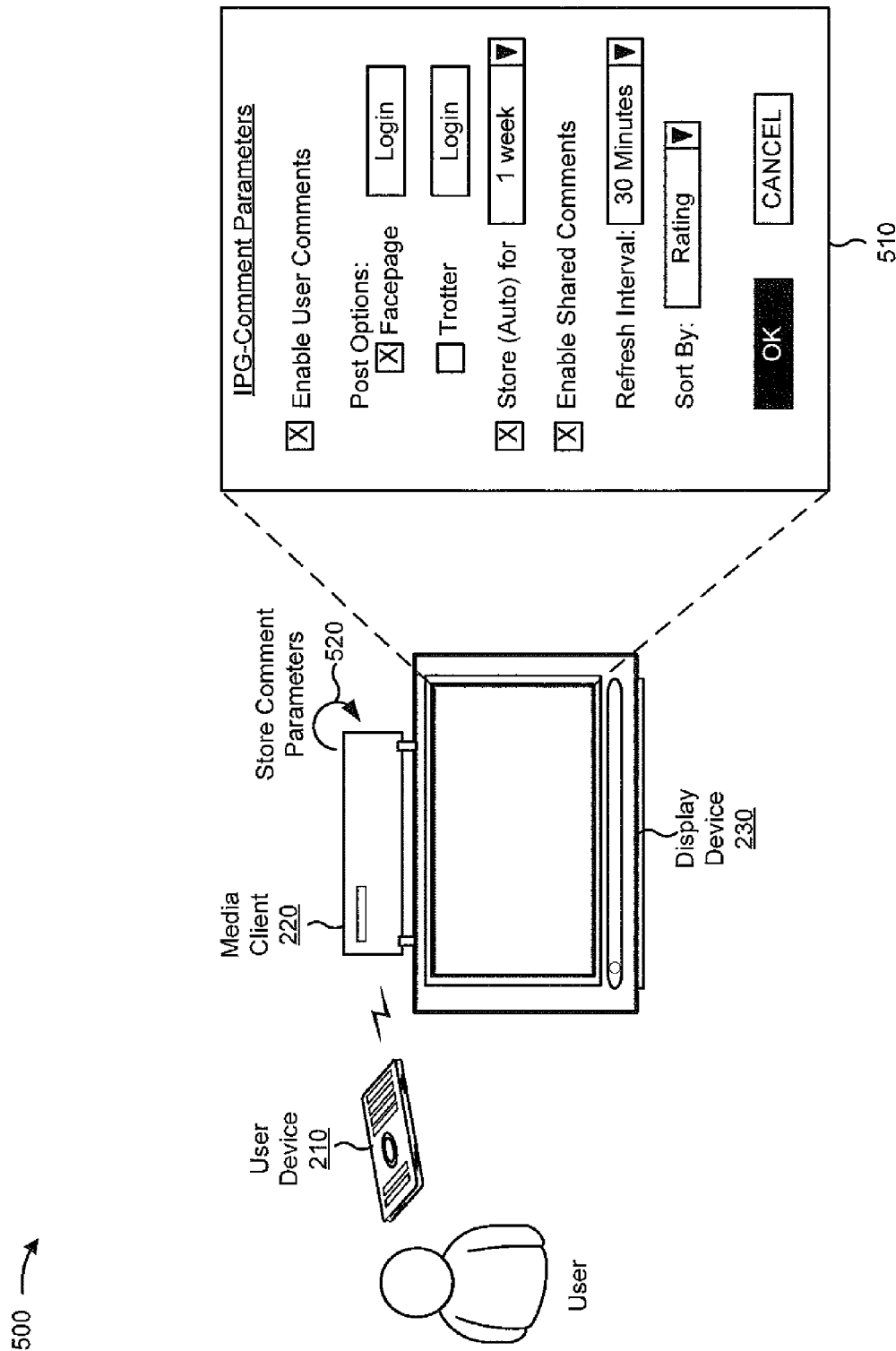
FIG. 5 is a diagram of an example implementation relating to the example process shown in FIG. 4.

FIG. 5 is diagram of an example implementation 500 relating to example process 400 shown in FIG. 4. For the purposes of example implementation 500, assume that a user, associated with media client 220, wishes to provide comment parameters associated with receiving, displaying, providing, and/or sharing comments (e.g., user comments, shared comments) via media client 220. Further, assume that media client 220 has provided, for display, a user interface that allows the user to provide (e.g., via user device 210) the comment parameters.

As shown in FIG. 5, media client 220 may provide, for display via display device 230, a user interface associated with inputting the comment parameters. As shown by reference number 510, the user may provide, via user device 210, input associated with the comment parameters. As shown, the user may indicate (e.g., by selecting a first check box) that a user comment feature (e.g., a feature that allows the user to provide or receive a user comment) is to be enabled (e.g., Enable User Comments). As further shown, the user may indicate (e.g., by selecting a second check box) that the user wishes to have the option to post user comments to a first social media account, associated with a first social media application (e.g., Facepage), and the user may provide login information associated with the first social media account (e.g., after selecting a Login button). As shown, the user may indicate (e.g., by not selecting a second check box) that the user does not wish to have the option to post user comments to a second social media account associated with a second social media application (e.g., Trotter). As further shown, the user may indicate (e.g., by selecting a third check box) that that the user wishes for media client 220 to automatically store user comments on media client 220 (e.g., Store (Auto)), and the user may indicate (e.g., via a drop down menu) a length of time (e.g., 1 week) that media client 220 is to store the user comments.

As further shown by reference number 510, the user may indicate (e.g., by selecting a fourth check box) that a shared comment feature (e.g., a feature that allows the user to view shared comments associated provided by other users) is to be enabled (e.g., Enable Shared Comments). As further shown, the user may indicate (e.g., via a drop down menu) that media client 220 is to check for new user comments at thirty minute intervals (e.g., Refresh Interval: 30 Min.) while the user viewing media content (e.g., when the user views the same television program for thirty consecutive minutes). As further shown, the user may indicate (e.g., via a drop down menu) that the shared comments, associated with media content, are to be sorted by a rating associated with the shared comments (e.g., Sort by: Rating) rather than another sorting method (e.g., by time, by date, by relationship to users that provided the shared comments, by geographic locations from which the shared comments were received, etc.).

As shown, the user may indicate (e.g., by selecting an OK button), that media client 220 is to store the comment parameters. As shown by reference number 520, media client 220 may store the comment parameters.

As indicated above, FIG. 5 is provided merely as an example. Other examples are possible and may differ from what was described with regard to FIG. 5.

Figure 6:
FIG. 6 is a flow chart of an example process for receiving user metadata, associated with media content, and providing the user metadata.

FIG. 6 is a flow chart of an example process 600 for receiving user metadata, associated with media content, and providing the user metadata. In some implementations, one or more process blocks of FIG. 6 may be performed by media client 220. In some implementations, one or more process blocks of FIG. 6 may be performed by another device or a group of devices separate from or including media client 220, such as another device included in environment 200. While FIG. 6 describes user metadata in the form of user comments, the processes and/or methods associated with FIG. 6 may equally apply to forms of metadata other than user comments, such as a review, an opinion, or the like. Similarly, while FIG. 6 describes media content in the form of programs (e.g., television programs), the processes and/or methods associated with FIG. 6 may equally apply to forms of media content other than programs, such as movies, music videos, or the like.

As shown in FIG. 6, process 600 may include receiving a user comment associated with a program identified by a program identifier (block 610). For example, media client 220 may receive a user comment associated with a program identified by a program identifier. In some implementations, media client 220 may receive the user comment when a user provides the user comment via user device 210.

In some implementations, the user comment may include information (e.g., a string of characters, a word, a sentence, a rating, etc.) provided by the user, that the user wishes to be stored (e.g., by media client 220) and/or shared (e.g., to content server 250, to social media servers 260) as being related to a particular program. In some implementations, the program to which the user comment is to be related may be identified by a program identifier. A program identifier may include a string of characters (e.g., a program identification number, a program name, etc.) that identifies a program.

In some implementations, media client 220 may receive the user comment via a user interface associated with the IPG. For example, the user may navigate to the program in the IPG, and media client 220 may provide, for display, an information screen associated with the program (e.g., a screen that includes, for example, the title of the program, a date associated with the program, information associated with the cast of the program, a plot summary of the program, etc.). In this example the information screen may include an input element (e.g., a comment button) that, when selected, may cause media client 220 to provide a user interface (e.g., including a text box, a keyboard, a rating system, etc.) that allows the user to provide the user comment. The user may provide the user comment (e.g., via user device 210), and media client 220 may display the user comment within the information screen associated with the program. Additionally, or alternatively, media client 220 may receive the user comment via a user interface associated with a recorded program identified in the IPG (e.g., when the user records the program, via the IPG, and provides the user comment at a later time).

As further shown in FIG. 6, process 600 may include determining a manner in which the user comment is to be processed (block 620). For example, media client 220 may determine a manner in which the user comment is to be processed by media client 220. In some implementations, media client 220 may determine the manner in which the user comment is to be processed after media client 220 receives the user comment. Additionally, or alternatively, media client 220 may determine the manner in which the user comment is to be processed when media client 220 receives information, indicating that media client 220 is to determine the manner in which the user comment is to be processed, from another device, such as user device 210 (e.g., after the user indicates that the user is finished providing the user comment).

In some implementations, media client 220 may determine the manner in which the user comment is to be processed based on comment parameters associated with the IPG. For example, media client 220 may receive the user comment, and media client 220 may determine the manner in which the user comment is to be processed based on comment parameters, associated with the IPG, stored by media client 220 in the manner described above. As an example, the comment parameters may indicate that media client 220 is to automatically store the user comment (e.g., in a memory location of media client 220). In some implementations, media client 220 may process the user comment based on user-specific comment parameters (e.g., comment parameters that apply only to the user) stored by media client 220. Additionally, or alternatively, media client 220 may process the user comment based on comment parameters that apply to all users associated with media client 220.

Additionally, or alternatively, media client 220 may determine the manner in which the user comment is to be processed based on user input. For example, the user may provide the user comment, and the user may provide (e.g., via an input element included in a user interface associated with providing the user comment) information indicating a manner in which the user comment is to be processed. As an example, the user may provide the user comment, and may indicate (e.g., by selecting a first button) that the user comment is to be shared via a social media account associated with the user. Continuing this example, the user may indicate (e.g., by selecting a second button) that the user comment is to be shared with other users associated with a service provider that provides the IPG. In some implementations, media client 220 may determine the manner in which the user comment is to be processed based on a comment parameter and/or based on user input.

As further shown in FIG. 6, process 600 may include processing the user comment in the manner in which the user comment is to be processed (block 630). For example, media client 220 may process the user comment in the manner in which the user comment is to be processed. In some implementations, media client 220 may process the user comment after media client 220 determines the manner in which the user comment is to be processed. Additionally, or alternatively, media client 220 may process the user comment when media client 220 receives information, indicating that media client 220 is to process the user comment, from another device, such as user device 210.

In some implementations, media client 220 may process the user comment in the manner identified with regard to block 620. For example, if media client 220 determines that the user comment is to be stored by media client 220, then media client 220 may process the user comment by providing the user comment for storage, accordingly. In some implementations, media client 220 may store the user comment such that the user comment is associated with a particular program (e.g., program A, season 2, episode 5). Additionally, or alternatively, media client 220 may store the user comment such that the user comment is associated with a program series associated with the program (e.g., program A, all seasons, all episodes).

In some implementations, media client 220 may store the user comment in accordance with a comment parameter that indicates a period of time that media client 220 is to store the user comment. Additionally, or alternatively, media client 220 may store the user comment until IPG information, associated with the program, is no longer available (e.g., until updated IPG information is provided to media client 220 by content server 250, where the updated IPG information does not include information associated with the program). Additionally, or alternatively, media client 220 may store the user comment until the program is no longer available to media client 220 (e.g., until the user deletes the program from a digital video recorder (DVR) associated with media client 220).

As another example, if media client 220 determines that the user comment is to be shared via social media account, associated with the user, then media client 220 may process the user comment by providing the user comment to social media server 260 (e.g., directly, or via content server 250) that hosts a social media application associated with the social media account. As yet another example, if media client 220 determines that the user comment is to be shared with other users associated with the service provider that provides the IPG, then media client 220 may process the user comment by providing the user comment to content server 250.

In this way, the user may provide the user comment and the user comment may be shared with other users associated with the service provider that provides the IPG, and/or with other users associated with the social media application (e.g., friends, family, contacts, circles, etc. associated with the user). Gamification concepts may then be applied to the user comment to encourage communication among users. For example, game-like features may be added to encourage friends of the user, associated with the social media application, to view the user comment and rate (e.g., thumbs-up, thumbs-down, based on a rating scale, etc.) the user comment. In this example, the user may view a rating based on the ratings provided by the friends of the user, and the user may respond to the rating indicated by other users, may provide another user comment, etc.

In some implementations, media client 220 may provide the program identifier (e.g., that identifies the program associated with the user comment), along with the user comment. For example, media client 220 may provide the user comment and the program identifier to content server 250 to allow content server 250 to store the user comment such that content server 250 may identify comments, associated with the program, at a later time based on the program identifier. In some implementations, content server 250 may act as a centralized server that stores program identifiers, associated with the program, for multiple service providers (e.g., when each service provider uses a different program identifier for the program). In this way, the user comment may be shared across service providers (e.g., since content server 250 may store multiple program identifies that identify the program).

In some implementations, media client 220 may allow the user to provide a response associated with the user comment. For example, media client 220 may provide the user comment, another user may view the user comment (e.g., in the manner described with regard to process 800), and the other user may provide a first response associated with the user comment. In this example, content server 250 may identify the first response to the user comment, and may provide a notification of the response to media client 220. Media client 220 may then provide, for display via display device 230, the first response to the user comment, and media client 220 may allow the user to provide a second response (e.g., a response to the first response) to the user comment (e.g., such that the other user may view the second response).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
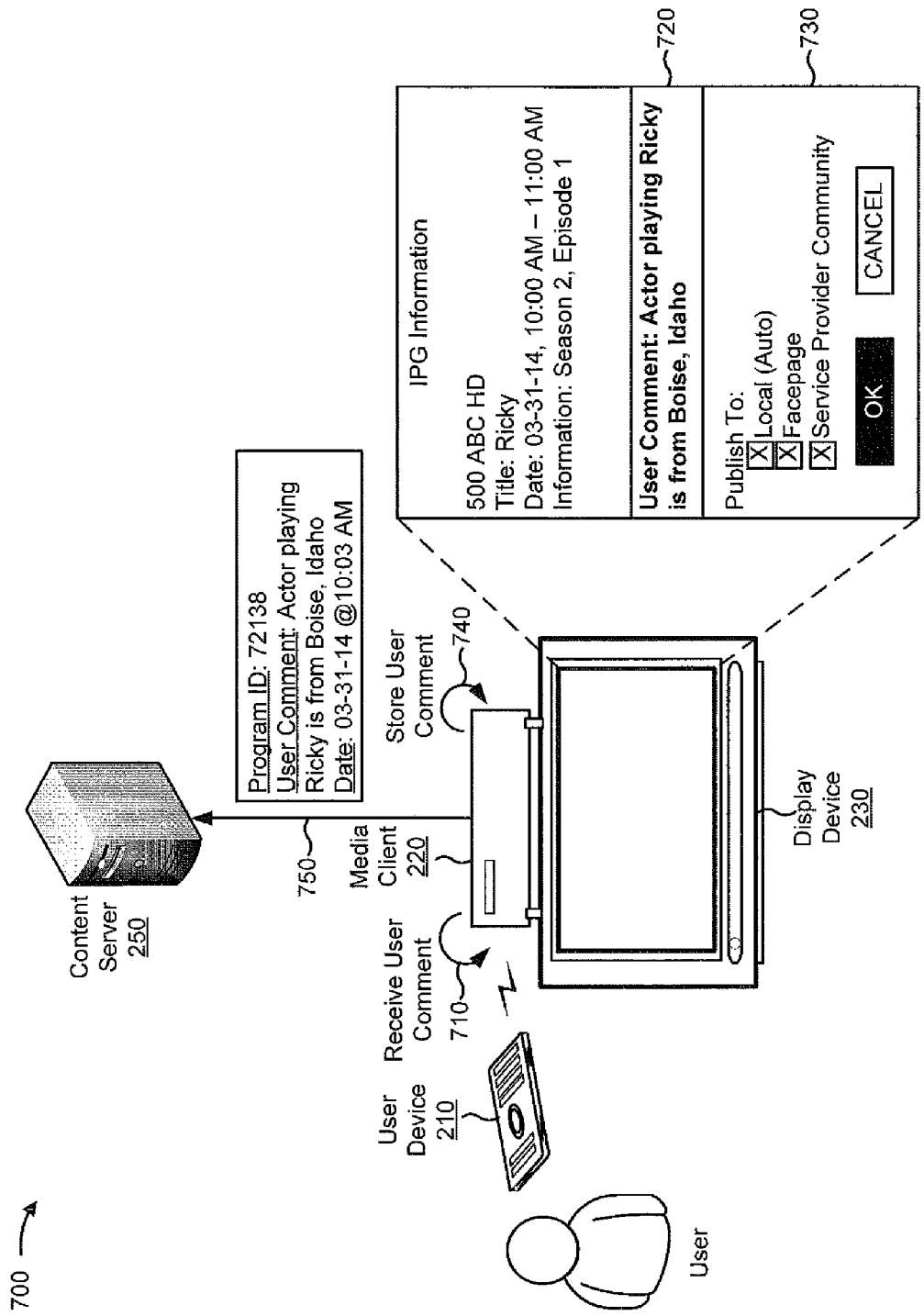
FIGS. 7A and 7B are diagrams of an example implementation relating to the example process shown in FIG. 6.
Figure 7B:
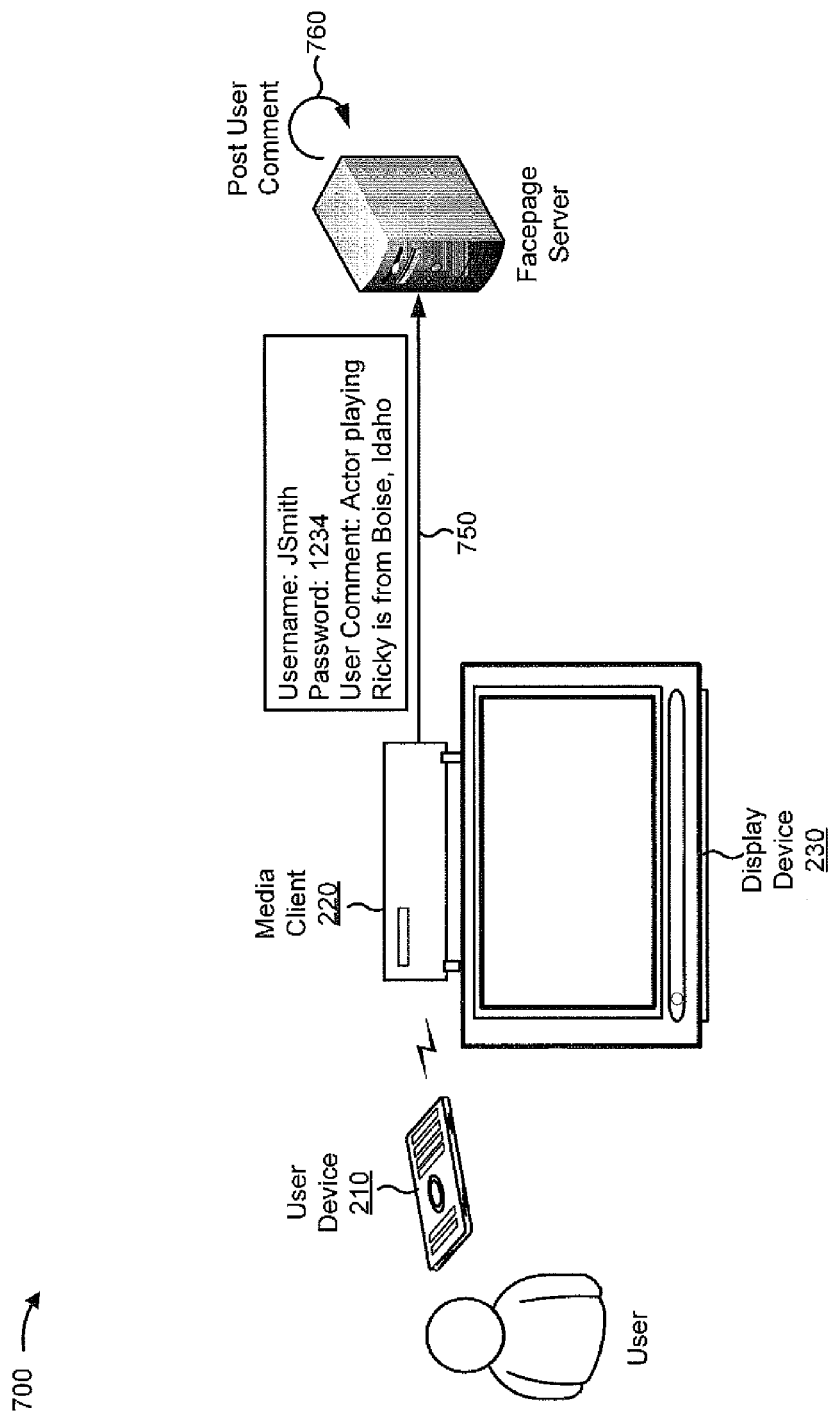

FIGS. 7A and 7B are diagrams of an example implementation 700 relating to example process 600 shown in FIG. 6. For the purposes of example implementation 700 of FIGS. 7A and 7B, assume that a user has navigated the IPG such that media client 220 has provided, for display via display device 230, an information screen associated with a program, titled Ricky, included in the IPG. Further, assume that the program is identified by a program identifier of 72138 (e.g., not displayed in the information screen, but stored by media client 220 and content server 250). Finally, assume that the user wishes to provide a user comment associated with the program.

As shown in FIG. 7A, the information screen may include information that identifies a channel associated with the program (e.g., 500 ABC HD), the title of the program (e.g., Ricky), a date and a time associated with the program (e.g., Date: 3-31-14, 10:00 a.m.-11:00 a.m.), and a summary associated with the program (e.g., Info: Season 2, Episode 1).

As further shown, assume that the user has indicated (e.g., by selecting a Comment button included in the information screen), that the user wishes to provide a user comment associated with the program. As shown by reference number 710, media client 220 may receive input associated with the user comment via user device 210, and, as shown by reference number 720, media client 220 may provide, for display in the information screen, the user comment (e.g., Actor playing Ricky is from Boise, Id.). As shown by reference number 730, media client 220 may determine a manner in which the user comment is to be treated. As shown, media client 220 may determine (e.g., based on comment parameters stored by media client 220) that the user comment is to be automatically stored to media client 220 (e.g., Local(Auto)), may determine (e.g., based on the user selecting a Facepage check box), that the user comment is to be posted to a Facepage account associated with the user, and may determine (e.g., based on the user selecting a Service Provider Community check box), that the user comment is to be provided to content server 250 such that other users, associated with a service provider related to media client 220, may view the user comment. As further shown, the user may indicate (e.g., by selecting an OK button) that the user has finished providing the comment.

As shown by reference number 740, media client 220 may store the user comment (e.g., in a memory location of media client 220). As shown by reference number 750, media client 220 may provide the program identifier (e.g., Program ID: 72138), the user comment, and a date and time associated with the user comment (e.g., 3-31-14@10:03 a.m.) to content server 250, and content server 250 may store the user comment (e.g., in a memory location associated with the program identifier).

As shown in FIG. 7B, and by reference number 750, media client 220 may provide the user comment, and login information (e.g., stored by media client 220) associated with the user's Facepage account (e.g., Username: jsmith, Password: 1234) to a Facepage server, and, as shown by reference number 760, the Facepage server may post the user comment to the user's social media account.

The user comment may be viewed by other users included in the service provider community (e.g., when the other users view the Ricky program identified by program ID 72138). Similarly, the user comment may be viewed by other users associated with the social media application, such as friends of the user, contacts of the user, groups associated with the user, etc. In some implementations, the other users, associated with the social media application, may receive, via social media accounts of the other users, information indicating the user has provided a user comment. The other users may then interact with the user comment by responding to the user comment, voting on the user comment, rating the user comment, etc. (e.g., and the user may then view information associated with the interactions of the other users). Gamification of user comments in this manner may encourage users to communicate and/or interact regarding programs associated with the IPG.

As indicated above, FIGS. 7A and 7B are provided merely as an example. Other examples are possible and may differ from what was described with regard to FIGS. 7A and 7B.

FIG. 8 is a flow chart of an example process 800 for providing, for display, shared metadata, associated with media content, based on a content identifier. In some implementations, one or more process blocks of FIG. 8 may be performed by media client 220. In some implementations, one or more process blocks of FIG. 8 may be performed by another device or a group of devices separate from or including media client 220, such as another device included in environment 200. While FIG. 8 describes user metadata in the form of shared comments, the processes and/or methods associated with FIG. 8 may be equally applied to forms of shared metadata other than shared comments. Similarly, while FIG. 8 describes media content in the form of programs (e.g., television programs), the processes and/or methods associated with FIG. 8 may be equally applied to forms of media content other than programs, such as movies, music videos, or the like.

As shown in FIG. 8, process 800 may include receiving an indication to provide, for display, shared comments associated with a program (block 810). For example, media client 220 may receive an indication to provide, for display, shared comments associated with a program. In some implementations, media client 220 may receive the indication when a user, associated with media client 220, provides (e.g., via user device 210) input indicating that media client 220 is to display the shared comments associated with the program. Additionally, or alternatively, media client 220 may receive the indication when the indication is provided by another device, such as content server 250.

In some implementations, media client 220 may receive the indication based on user input. For example, the user, associated with media client 220, may provide (e.g., via user device 210) input indicating that the user wishes to view an information screen, associated with the program, via the IPG, and media client 220 may receive the indication to display shared comments, associated with the program, based on the user input. In some implementations, the IPG may indicate (e.g., by highlighting a portion of the IPG corresponding to the program) that shared comments are available for the program.

Additionally, or alternatively, the indication may be based on comment parameters stored by media client 220. For example, the user may provide input indicating that the user wishes to view the information screen via the IPG, and media client 220 may determine (e.g., based on information stored by media client 220) a comment parameter that indicates that media client 220 is to provide, for display, shared comments associated with the program (e.g., when the comment parameter indicates that the shared comment feature is enabled).

As further shown in FIG. 8, process 800 may include determining the shared comments, associated with the program, based on a program identifier that identifies the program (block 820). For example, media client 220 may determine the shared comments, associated with the program, based on a program identifier that identifies the program. In some implementations, media client 220 may determine the shared comments after media client 220 receives the indication to provide the shared comments for display. Additionally, or alternatively, media client 220 may determine the shared comments when media client 220 receives information, indicating that media client 220 is to determine the shared comments, from another device, such as user device 210.

In some implementations, media client 220 may determine the shared comments based on information stored by content server 250. For example, media client 220 may receive an indication that media client 220 is to provide, for display, shared comments associated with a program identified by a particular program identifier. In this example, media client 220 may send a request to content server 250 indicating that content server 250 is to provide, to media client 220, shared comments associated with the program identified by the particular program identifier. Based on the request, content server 250 may determine (e.g., based on shared comments stored by content server 250) the shared comments associated with the program, and may provide the shared comments to media client 220.

In some implementations, the shared comments may include user comments provided by other users of other media clients 220 and/or other users of media client 220 (e.g., when the other users have indicated that user comments are to be shared with a user community associated with the service provider). Additionally, or alternatively, the shared comments may include comments provided via social media server 260. For example, the shared comments may include comments, associated with the program, posted to social media accounts of other users. In some implementations, media client 220 may receive the shared comments from content server 250. Additionally, or alternatively, media client 220 may receive the shared comments from social media servers 260.

As further shown in FIG. 8, process 800 may include providing, for display, the shared comments associated with the program (block 830). For example, media client 220 may provide, for display, the shared comments associated with the program. In some implementations, media client 220 may provide the shared comments for display after media client 220 determines the shared comments. Additionally, or alternatively, media client 220 may provide the shared comments for display when media client 220 receives information, indicating that media client 220 is to provide the shared comments for display, from another device, such as user device 210 and/or content server 250.

In some implementations, media client 220 may provide the shared comments for display in accordance with comment parameters. For example, the comment parameters (e.g., stored by media client 220) may indicate that the shared comments are to be sorted for display in a particular manner (e.g., by date, by time, by rating, by user, etc.), and media client 220 may provide the shared comments for display in the particular manner. In some implementations, media client 220 may provide the shared comments for display within an information screen associated with the program. For example, the shared comments may be displayed below other information (e.g., general information associated with the program) included in the information screen associated with the program and the IPG. In this example, a first shared comment may be displayed in the information screen. In some implementations, the user may indicate (e.g., by selecting an arrow, by selecting a Next button, etc.) that the user wishes to view a second shared comment. Alternatively, media client 220 may automatically cycle through the shared comments by displaying the first shared comment for a period of time (e.g., 10 seconds, etc.), then displaying the second shared comment for the period of time, and so forth.

Here, the second shared comment may be displayed in place of the first shared comment. In other words, the user may view the shared comments one at a time via the information screen associated with the IPG. As another example, the shared comments may be displayed in a separate screen, associated with the IPG, that displays only the shared comments (e.g., when the user indicates that the user wishes to view multiple shared comments at the same time, when the user and/or a comment parameter indicates that the shared comments are to be display in a separate screen, etc.).

Additionally, or alternatively, the user may provide a response associated with a shared comment. For example, media client 220 may provide the shared comment for display, and the user may indicate (e.g., by selecting a Response button, etc.) that the user wishes to respond to the shared comment. In this example, the user may provide the response to media client 220, and media client 220 may provide (e.g., to content server 250, to social media server 260, etc.) the response as described with regard to process 600. Here, another media client 220 (e.g., a media client 220 associated with another user that provided the user comment to which the user responds) may provide a notification of the response to the other user, as described above.

Additionally, or alternatively, media client 220 may allow the user to provide feedback associated with the shared comment. For example, media client 220 may provide, for display, the shared comment, and may also provide one or more input elements (e.g., a vote up button, a vote down button, a thumbs-up button, a thumbs-down button, etc.) that allow the user to rate the shared comment. In this way, a first shared comment may be displayed before a second shared comment based on a rating associated with the comment (e.g., when media client 220 stores a comment parameter indicating that media client 220 is to provide the shared comments for display based on comment ratings associated with the comments). As another example, media client 220 may provide the shared comment for display, and may also provide an input element (e.g., a button, a radio button, etc.) that allows the user to report (e.g., to the service provider via content server 250) the comment as offensive, profane, inappropriate, an advertisement, etc. In this way, the service provider may hide, remove, edit, delete, etc. a shared comment such that the shared comment is no longer displayed (e.g., to any users).

By applying gamification concepts to the shared comment (e.g., allowing the user to rate the shared comment, vote on the shared comment, respond to the shared comment, interact with the shared comment, etc.), user communication and/or interaction, associated with programs included in an IPG, may be encouraged.

Additionally, or alternatively, media client 220 may provide the shared comment for display, and media client 220 may check for additional shared comments. For example, media client 220 may provide, for display, a set of shared comments (e.g., determined by media client 220 when the user initially selects the program in the IPG). In this example, media client 220 may determine whether additional shared comments, associated with the program, have been received by content server 250 and/or social media server 260 (e.g., while the user has been watching the program). If media client 220 determines that additional shared comments exist, then media client 220 may prompt the user (e.g., by providing, for display, a notification via display device 230) whether the user wishes to view the additional shared comments. If the user indicates (e.g., via user device 210) that the user wishes to view the additional shared comments, then media client 220 may provide the additional comments for display via the information screen, associated with the program, included in the IPG.

In some implementations, media client 220 may determine whether content server 250 and/or social media server 260 has received additional shared comments on a periodic basis (e.g., every 30 seconds, every 5 minutes, every 30 min, etc.). Additionally, or alternatively, media client 220 may determine whether content server 250 and/or social media server 260 has received additional shared comments based on a comment parameter stored by media client 220. In some implementations, media client 220 may determine whether there are additional shared comments while the user is viewing the program, as described above. Additionally, or alternatively, media client 220 may determine whether there are additional comments at another time (e.g., after the program has been recorded to a DVR, after the program has been scheduled to be recorded to the DVR).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
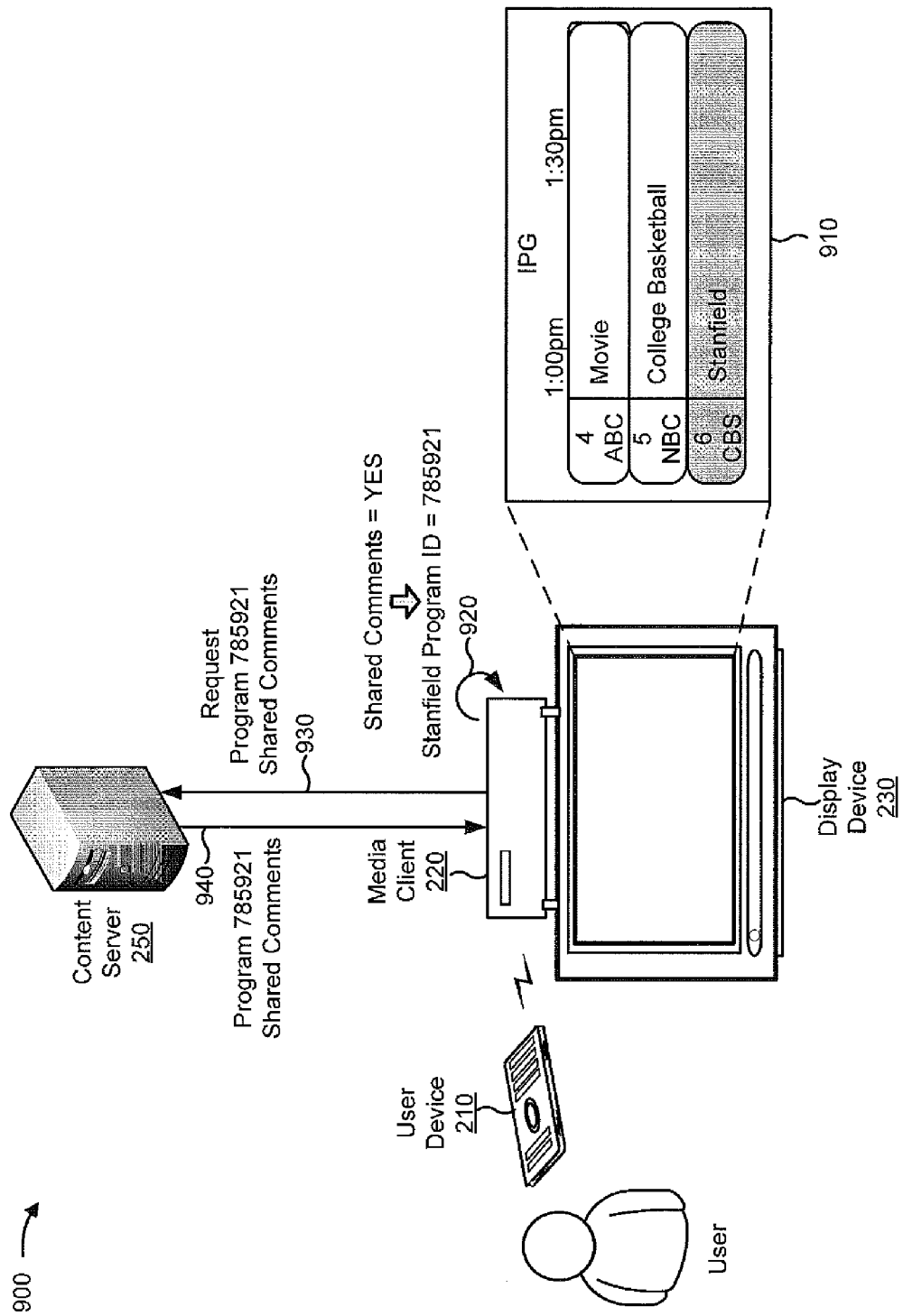
FIGS. 9A and 9B are diagrams of an example implementation relating to the example process shown in FIG. 8.
Figure 9B:
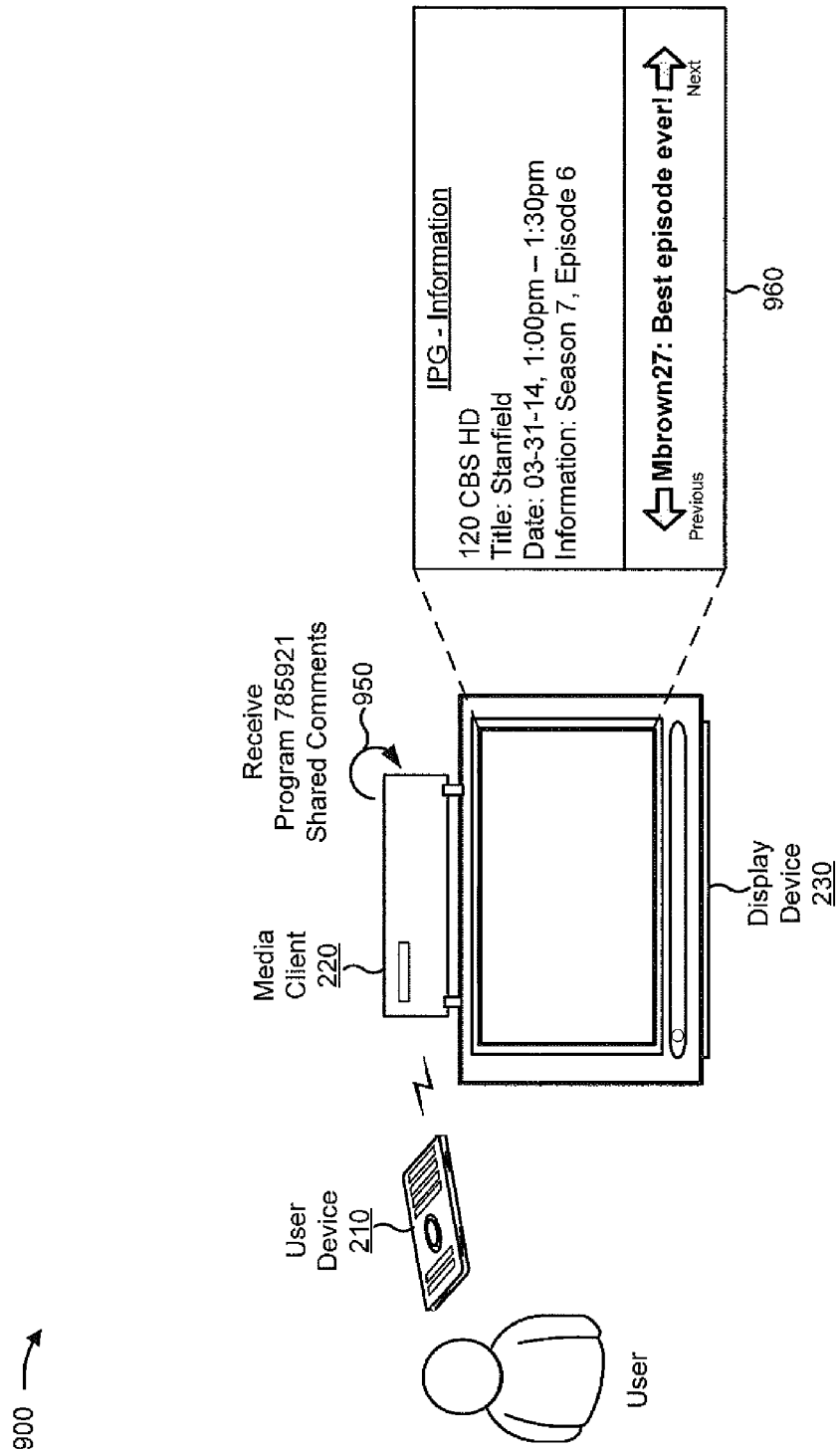

FIGS. 9A and 9B are diagrams of an example implementation 900 relating to example process 800 shown in FIG. 8. For the purposes of example implementation 900, assume that media client 220 has provided, for display, an IPG associated with a service provider.

As shown in FIG. 9A, and by reference number 910, assume that a user has navigated the IPG and indicated (e.g., based on input provided to user device 210) that the user wishes to view an information screen associated with a program included in the IPG, identified as Stanfield. As shown by reference number 920, media client 220 may determine (e.g., based on comment parameters stored by media client 220) that media client 220 is to provide, for display, shared comments, associated with the program, that have been shared with a user community associated with the service provider. As also shown by reference number 920, media client 220 may determine (e.g., based on guide information stored by media client 220) a program identifier associated with the program (e.g., 785921), and, as shown by reference number 930, may send, to content server 250, a request indicating that content server 250 is to provide shared comments associated with the program. As shown by reference number 940, content server 250 may receive the request, may determine shared comments (e.g., stored by content server 250), and may provide the shared comments to media client 220.

As shown in FIG. 9B, and by reference number 950, media client 220 may receive the shared comments associated with the program, and may provide, for display, an information screen, associated with the program, that includes a first shared comment of the shared comments. As shown by reference number 960, the information screen may include information that identifies a channel associated with the program (e.g., 120 CBS HD), the title of the program (e.g., Stanfield), a date and a time associated with the program (e.g., Date: 3-31-14, 1:00 p.m.-1:30 p.m.), and other information associated with the program (e.g., Info: Season 7, Episode 6). As further shown, the information screen may also include the first shared comment (e.g., MBrown27: Best episode ever!). As shown, the information screen may also include input elements (e.g., a previous arrow, a next arrow) that, when selected, allow the user to view other shared comments.

In some implementations, the user may view the shared comments associated with the program, and may interact with the user comment by responding to the user comment, voting on the user comment, rating the user comment, etc. Other users, associated with the shared comments, may be notified regarding the interaction with their respective shared comments, and may view information associated with the interaction of the other user. Gamification of user comments in this manner may encourage users to communicate and/or interact regarding programs associated with the IPG.

As indicated above, FIGS. 9A and 9B are provided merely as an example. Other examples are possible and may differ from what was described with regard to FIGS. 9A and 9B.

Implementations described herein may allow a user to provide user metadata, associated with media content included in an interactive program guide, such that the user may view and/or share the metadata via the interactive program guide. Implementations described herein may also allow the user to view shared metadata, associated with the media content and provided by another user, via the interactive program guide. Similarly, implementations described herein may allow the user to communicate with a community of users, associated with the media content, by applying gamification concepts to the user metadata and/or the shared metadata (e.g., by allowing the user to share the user metadata, interact with the shared metadata, respond to the shared metadata, vote on the shared metadata, rate the shared metadata, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive user metadata associated with media content identified in an interactive program guide (IPG),
         the user metadata being based on input provided by a user via the IPG, and
         the media content being associated with a media content identifier;
      determine a manner in which the user metadata is to be processed;
      process the user metadata in the manner in which the user metadata is to be processed,
         the device storing the user metadata until updated IPG information is received by the device,
            the updated IPG information not including information associated with the media content, the device deleting the user metadata when the updated IPG information is received by the device, the user metadata being processed to permit the user to view the user metadata, via the IPG, at a later time and when the device stores the user metadata, and the user metadata being processed to permit another user, associated with another device, to view the user metadata via another IPG; and provide, via the other device and the other IPG, an offer of a reward to the other user when the other user one of:
shares the user metadata via the other IPG,
responds to the user metadata via the other IPG,
votes on the user metadata via the other IPG, or
rates the user metadata via the other IPG.

2. The device of claim 1, where the one or more processors are further to:
process the user metadata to encourage the other user to interact with the user metadata.

3. The device of claim 1, where the one or more processors are further to:
cause the user metadata to be posted to a social media account associated with the user,
the user metadata being posted to the social media account to allow the other user to interact with the user metadata.

4. The device of claim 1, where the one or more processors are further to:
provide the user metadata and the media content identifier to a server to permit the other user to view the user metadata via the other IPG,
the other IPG being associated with the other device and the other user, and
the user metadata being provided to allow the other user to interact with the user metadata.

5. The device of claim 1, where the one or more processors are further to:
receive an indication that the user wishes to input the user metadata associated with the media content;
provide, for display, a user interface that allows the user to input the user metadata; and
receive the user metadata via the user interface that allows the user to input the user metadata.

6. The device of claim 1, where the one or more processors are further to:
provide the user metadata and the media content identifier to a server to permit the device to retrieve the user metadata, based on the media content identifier, and to cause the user metadata to be displayed via the IPG.

7. The device of claim 1, where the one or more processors are further to:
receive a notification that the other user has provided a response to the user metadata;
provide, for display, the notification;
receive an indication that the response is to be displayed based on providing the notification for display; and
provide, for display via the IPG, the response based on receiving the indication,
the response being provided to permit the user to provide a reply to the response.

8. A computer-readable medium storing instructions, the instructions comprising:
one or more instructions that, when executed by one or more processors, cause the one or more processors to:
receive an indication to provide, for display in an interactive program guide (IPG), shared metadata associated with media content identified in the IPG,
the indication being based on input provided by a user associated with a device,
the shared metadata including metadata provided by another user associated with another device,
the other device storing the shared metadata until updated IPG information is received by the other device,
the updated IPG information not including information associated with the media content,
the other device deleting the shared metadata when the updated IPG information is received by the other device;
determine, based on receiving the indication, a media content identifier that identifies the media content;
receive the shared metadata, associated with the media content, based on the media content identifier;
provide, for display in the IPG, the shared metadata, associated with the media content, after receiving the shared metadata; and
provide, via the other device and another IPG, an offer of a reward to the other user when the other user one of:
shares the shared metadata via the other IPG,
responds to the shared metadata via the other IPG,
votes on the shared metadata via the other IPG, or
rates the shared metadata via the other IPG.

9. The computer-readable medium of claim 8, where the instructions further comprise:
one or more instructions that, when executed by the one or more processors, cause the one or more processors to:
provide, for display in the IPG, one or more input elements that encourage the user to interact with the shared metadata.

10. The computer-readable medium of claim 8, where the instructions further comprise:
one or more instructions that, when executed by the one or more processors, cause the one or more processors to:
send a request to provide the shared metadata,
the request including the media content identifier; and
receive a response to the request,
the response including the shared metadata associated with the media content.

11. The computer-readable medium of claim 8, where the instructions further comprise:
one or more instructions that, when executed by the one or more processors, cause the one or more processors to:
receive, based on user input, information associated with a user interaction associated with the shared metadata; and
provide the information associated with the user interaction,
the information associated with the user interaction being provided to cause the other user, associated with the shared metadata, to be notified regarding the user interaction.

12. The computer-readable medium of claim 8, where the instructions further comprise:
one or more instructions that, when executed by the one or more processors, cause the one or more processors to:

provide, for display in the IPG, a first portion of the shared metadata;
receive an indication that the user wishes to view a second portion of the shared metadata,
the indication being based on user input; and
provide, for display in the IPG, the second portion of the shared metadata,
the second portion of the shared metadata replacing the first portion of the shared metadata in the IPG.

13. The computer-readable medium of claim 8, where the instructions further comprise:
one or more instructions that, when executed by the one or more processors, cause the one or more processors to:
provide, for display in the IPG, an input element that permits the user to provide a response to the shared metadata;
receive, via the input element, user input indicating the response to the shared metadata; and
provide the response to the shared metadata,
the response to the shared metadata being provided to permit the other user, associated with the shared metadata, to view the response to the shared metadata via the other device.

14. The computer-readable medium of claim 8, where the instructions further comprise:
one or more instructions that, when executed by the one or more processors, cause the one or more processors to:
identify additional shared metadata associated with the media content;
provide, for display, a notification that the additional shared metadata has been identified;
receive, after providing the notification, an indication to display the additional shared metadata,
the indication being based on user input; and
provide, for display, the additional shared metadata in the IPG.

15. A method, comprising:
receiving, by a device, an indication that a user wishes to provide a user comment related to content identified in an interactive program guide (IPG),
the content being associated with a content identifier;
providing, by the device and for display, a user interface, associated with the IPG, that allows the user to input the user comment via the IPG;
receiving, by the device, the user comment via the user interface;
determining, by the device, a manner in which the user comment is to be processed;
processing, by the device, the user comment in the determined manner,
the device storing the user comment until updated IPG information is received by the device,
the updated IPG information not including information associated with the content,
the device deleting the user comment when the updated IPG information is received by the device,
the user comment being processed to permit the user to view the user comment, via the IPG, at a later time and when the device stores the user comment, and
the user comment being processed to permit another user, associated with another device, to view the user comment via another IPG; and
providing, via the device and the other IPG, an offer of a reward to the other user when the other user one of:
shares the user comment via the other IPG,
responds to the user comment via the other IPG,
votes on the user comment via the other IPG, or
rates the user comment via the other IPG.

16. The method of claim 15, further comprising:
receiving user input that identifies a set of parameters; and
determining the manner in which the user comment is to be processed based on the set of parameters.

17. The method of claim 15, further comprising:
processing the user comment to encourage the other user to interact with the user comment.

18. The method of claim 15, further comprising:
causing the user comment to be posted to a social media account associated with the user,
the user comment being posted to the social media account to allow the other user to respond to the user comment.

19. The method of claim 15, further comprising:
providing the user comment and the content identifier to a server to permit the other user to view the user comment via the other IPG,
the other IPG being associated with the other device and the other user, and
the user comment being provided to allow the other user to interact with the user comment.

20. The method of claim 15, further comprising:
receiving a notification that the other user has provided a response to the user comment;
providing, for display, the notification;
receiving an indication that the response is to be displayed based on providing the notification for display; and
providing, for display via the IPG, the response based on receiving the indication,
the response being provided to permit the user to provide a reply to the response.

* * * * *